United States Patent Office 3,660,381
Patented May 2, 1972

3,660,381
5-ARYL-1H-1,5-BENZODIAZEPINE-2,4-DIONES
Karl-Heinz Weber, Gau-Algesheim, Herbert Merz and Karl Zeile, Ingelheim am Rhein, Rolf Giesemann, Bingen, and Peter Danneberg, Ingelheim am Rhein, Germany, assignors to C. H. Boehringer Sohn, Ingelheim am Rhein, Germany
No Drawing. Filed July 10, 1969, Ser. No. 840,839
Int. Cl. C07d 53/04
U.S. Cl. 260—239.3                    8 Claims

ABSTRACT OF THE DISCLOSURE 5-aryl-1H-1,5-benzodiazepine-2,4-diones of a formula selected from the group consisting of

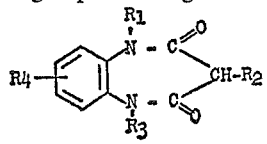

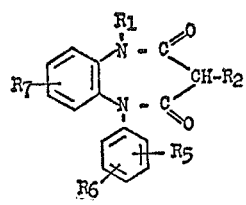

and

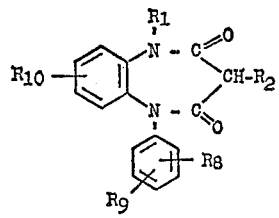

wherein $R_1$ is allyl, methylallyl, dimethylallyl, chloroallyl, cyclohexyl, cycloalkylmethyl, cycloalkylenylmethyl of 4 to 7 carbon atoms, phenyl, tolyl, xylyl, methoxyphenyl, dimethoxyphenyl, halophenyl, phenylalkyl of 7 to 8 carbon atoms, pyridyl or

—A—X where

A is straight or branched alkylene of 1 to 4 carbon atoms, and
X is hydroxyl, alkoxy, acyloxy, dialkylamino of 2 to 4 carbon atoms, or a 5- to 6-membered nitrogen-containing heterocyclic ring linked to A through a ring nitrogen atom,
$R_2$ is hydrogen or methyl,
$R_3$ is naphthyl, pyrimidyl, thienyl, pyridyl, methylpyridyl or halopyridyl,
$R_4$ is hydrogen, methyl, methoxy, trifluoromethyl, cyano, halogen, lower alkanoyl or (lower alkoxy of 1 to 2 carbon atoms)-carbonyl,
$R_5$ is hydrogen, methyl, ethyl, methoxy, trifluoromethyl, cyano, nitro, halogen, lower alkanoyl or lower alkoxycarbonyl,
$R_6$ is hydrogen, methyl, ethyl, methoxy or halogen,
$R_7$ is cyano, lower alkanoyl or lower alkoxycarbonyl,
$R_8$ is cyano, nitro, lower alkanoyl or lower alkoxycarbonyl,
$R_9$ is hydrogen, methyl, ethyl, methoxy or halogen, and
$R_{10}$ is hydrogen, methyl, methoxy, trifluoromethyl or halogen, useful as psychosedative and anticonvulsives in warmblooded animals.

This invention relates to novel 5-aryl-1H-1,5-benzodiazepine-2,4-diones, as wel as to a method of preparing these compounds.

More particularly, the present invention relates to 5-aryl - 1H - 1,5-benzodiazepine-2,4-diones of a formula selected from the group consisting of

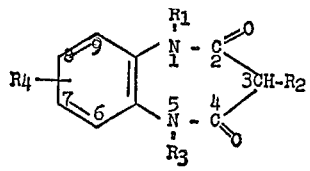
(I)

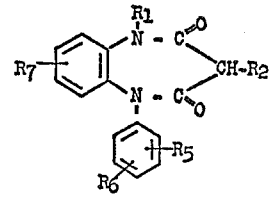
(II)

and

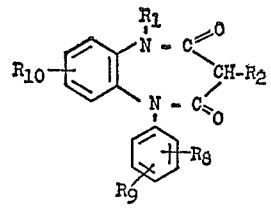
(III)

wherein $R_1$ is allyl, methylallyl, dimethylallyl, chloroallyl, cyclohexyl, cycloalkylmethyl, cycloalkenylmethyl of 4 to 7 carbon atoms, phenyl, tolyl, xylyl, methoxyphenyl, dimethoxyphenyl, halophenyl, phenylalkyl of 7 to 8 carbon atoms, pyridyl or

—A—X where

A is straight or branched alkylene of 1 to 4 carbon atoms, and
X is hydroxyl, alkoxy, acyloxy, dialkylamino of 2 to 4 carbon atoms, or a 5- to 6-membered nitrogen-containing heterocyclic ring linked to A through a ring nitrogen atom,
$R_2$ is hydrogen or methyl,
$R_3$ is naphthyl, pyrimidinyl, thienyl, pyridyl, methylpyridyl or halopyridyl,
$R_4$ is hydrogen, methyl, methoxy, trifluoromethyl, cyano, halogen, lower alkanoyl or (lower alkoxy of 1 to 2 carbon atoms)-carbonyl,
$R_5$ is hydrogen, methyl, ethyl, methoxy, trifluoromethyl, cyano, nitro, halogen, lower alkanoyl or lower alkoxycarbonyl,
$R_6$ is hydrogen, methyl, ethyl, methoxy or halogen,
$R_7$ is cyano, lower alkanoyl or lower alkoxycarbonyl,
$R_8$ is cyano, nitro, lower alkanoyl or lower alkoxycarbonyl,
$R_9$ is hydrogen, methyl, ethyl, methoxy or halogen, and
$R_{10}$ is hydrogen, methyl, methoxy, trifluoromethyl or halogen.

The compounds according to the present invention may be prepared by arylation or heteroarylation at the nitrogen atom in 5-position of a 1H-1,5-benzodiazepine-2,4-dione of the formula (IV)

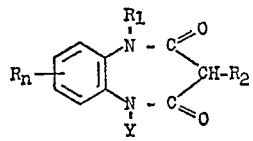

wherein $R_1$ and $R_2$ have the same meanings as in Formulas I, II and III above, $R_n$ is $R_4$, $R_7$ or $R_{17}$, as defined above, and Y is hydrogen, an alkali metal or acyl, with a compound of the formula $$X—R_m \qquad (V)$$

wherein $R_m$ is $R_3$,

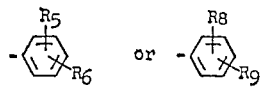

as defined above, and

X is halogen.

The arylation is carried out in the presence of copper powder, a copper-I-salt or a copper-II-salt or a mixture thereof, either by using the aryl halide of the Formula V in excess or in a polar aprotic solvent, such as dimethylformamide, dimethylsulfoxide or hexamethylphosphoric acid triamide. If a solvent is used, the aryl halide is merely added in the calculated quantity. The reaction temperature depends on the starting materials employed in each case and lies in general between 90 and 180° C. If a compound of the Formula II wherein Y is hydrogen or acyl is used, the addition of a suitable organic or inorganic base, such as an alkali metal carbonate, alkali metal bicarbonate or alkali metal alcoholate, preferably of an alkali metal acetate, in molar quantities or in excess is required in order to bind the hydrogen halide formed by the arylation reaction. If in a compound of the Formula I the radical $R_1$ represents a hydroxyalkyl group, the hydroxyl group may subsequently be converted into an alkoxy group by treatment with a diazoalkane in the presence of borofluoride etherate.

If the radical $R_1$ in a compound of the Formula I is dialkylaminoalkyl, it is possible to introduce a double bond into the alkyl group by quaternization and splitting off trialkylamine. Furthermore, in a compound of the Formula I wherein $R_1$ is alkenyl, the latter may be hydrogenated in known manner.

The 1H-1,5-benzodiazepine-2,4-diones of the Formula IV used as starting materials for the preparation of a compound of the Formula II are also novel. They may, for instance, be obtained by reaction of a correspondingly substituted 2-nitroaniline with a malonic acid monoalkylester halide, reduction of the formed 2-nitromalonic acid alkyl ester anilide, and cyclization of the 2-aminomalonic acid ethylester anilide according to the following reaction sequence:

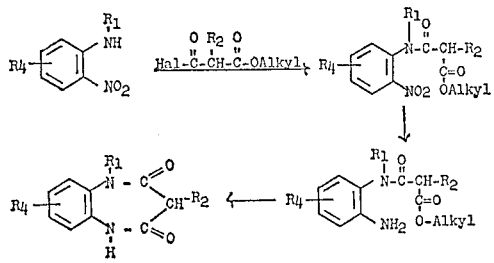

According to the process described above, the following end products may, for instance, be obtained:

7-chloro-1-methyl-5-(2'-pyridyl)-1H-1,5-benzodiazepine-2,4-(3H,5H)-dione, 7-chloro-1-methyl-5-(1'-naphthyl)-1H-1,5-benzodiazepine-2,4-(3H,5H)-dione,
7-chloro-1-methyl-5-(2'-thienyl)-1H-1,5-benzodiazepine-2,4-(3H,5H)-dione,
7-chloro-1-methyl-5-(3'-pyridyl)-1H-1,5-benzodiazepine-2,4(3H,5H)-dione,
7-chloro-5-[5'-chloropyridyl-(2')]-1-methyl-1H-1,5-benzodiazepine-2,4-(3H,5H)-dione,
7-chloro-1-methyl-5-[4'-methyl-pyridyl-(2')]-1H-1,5-benzodiazepine-2,4-(3H,5H)-dione,
7-chloro-1-methyl-5-(2'-nitrophenyl)-1H-1,5-benzodiazepine-2,4-(3H,5H)-dione,
7-chloro-5-(2'-cyanophenyl)-1-methyl-1H-1,5-benzodiazepine-2,4-(3H,5H)-dione,
7-chloro-5-(2'-methoxycarbonyl-phenyl)-1-methyl-1H-1,5-benzodiazepine-2,4-(3H,5H)-dione,
5-(2'-acetylphenyl)-7-chloro-1-methyl-1H-1,5-benzodiazepine-2,4-(3H,5H)-dione,
7-methoxycarbonyl-1-methyl-5-phenyl-1H-1,5-benzodiazepine-2,4-(3H,5H)-dione,
1-methyl-5-(2'-pyridyl)-7-trifluoromethyl-1H-1,5-benzodiazepine-2,4-(3H,5H)-dione,
7-bromo-1-methyl-5-(2'-pyridyl)-1H-1,5-benzodiazepine-2,4-(3H,5H)-dione,
7-chloro-1-methyl-5-(2'-pyrimidyl)-1H-1,5-benzodiazepine-2,4-(3H,5H)-dione,
7-cyano-1-methyl-5-phenyl-1H-1,5-benzodiazepine-2,4-(3H5H)-dione,
1-ethyl-8-chloro-5-(2'-pyridyl)-1H-1,5-benzodiazepine-2,4-(3H,5H)-dione,
1-ethyl-7-chloro-5-(2'-pyridyl)-1H-1,5-benzodiazepine-2,4-(3H,5H)-dione,
1-ethyl-7-chloro-5-(3'-pyridyl)-1H-1,5-benzodiazepine-2,4-(3H,5H)-dione,
7-chloro-1-n-propyl-5-(2'-pyridyl)-1H-1,5-benzodiazepine-2,4-(3H,5H)-dione,
1-n-butyl-7-chloro-5-(2'-pyridyl)-1H-1,5-benzodiazepine-2,4-(3H,5H)-dione,
7-chloro-1-cyclohexyl-5-(2'-pyridyl)-1H-1,5-benzodiazepine-2,4-(3H,5H)-dione,
7-chloro-1-(β-hydroxyethyl)-5-(2'-pyridyl)-1H-1,5-benzodiazepine-2,4-(3H,5H)-benzodiazepine-2,4-(3H,5H)-dione,
7-chloro-1-dimethylaminoethyl-5-(2'-pyridyl)-1H-1,5-benzodiazepine-2,4-(3H,5H)-dione,
8-chloro-1-phenyl-5-(2'-pyridyl)-1H-1,5-benzodiazepine-2,4-(3H,5H)-dione,
8-chloro-1-phenyl-5-thienyl-1H-1,5-benzodiazepine-2,4-(3H,5H)-dione,
7-bromo-5-(2'-cyanophenyl)-1-methyl-1H-1,5-benzodiazepine-2,4-(3H,5H)-dione,
7-bromo-1-methyl-5-(2'-nitrophenyl)-1H-1,5-benzodiazepine-2,4-(3H,5H)-dione,
1-methyl-5-(2'-nitrophenyl)-7-trifluoromethyl-1H-1,5-benzodiazepine-2,4-(3H,5H)-dione,
5-(2'-cyanophenyl)-1-methyl-7-trifluoromethyl-1H-1,5-benzodiazepine-2,4-(3H,5H)-dione,
5-(2'-cyanophenyl)-7-fluoro-1-methyl-1H-1,5-benzodiazepine-2,4-(3H,5H)-dione,
7-fluoro-1-methyl-5-(2'-nitrophenyl)-1H-1,5-benzodiazepine-2,4-(3H,5H)-dione,
7-chloro-1-isopropyl-5-(2'-pyridyl)-1H-1,5-benzodiazepine-2,4-(3H,5H)-dione,
7-acetyl-1-methyl-5-phenyl-1H-1,5-benzodiazepine-2,4-(3H,5H)-dione,
7-chloro-1-dimethylamino-ethyl-5-(2'-nitrophenyl)-1H-1,5-benzodiazepine-2,4-(3H,5H)-dione,
7-chloro-1-cyclohexyl-5-(2'-nitrophenyl)-1H-1,5-benzodiazepine-2,4-(3H,5H)-dione,
1-acetoxyethyl-5-(2'-nitrophenyl)-7-trifluoromethyl-1H-1,5-benzodiazepine-2,4-(3H,5H)-dione,
1-acetoxyethyl-7-chloro-5-(2'-pyridyl)-1H-1,5-benzodiazepine-2,4-(3H,5H)-dione.

The following examples further illustrate the present invention and will enable others skilled in the art to understand it more completely. It should be understood, however, that the invention is not limited solely to the particular examples given below.

EXAMPLE 1

7-chloro-1-methyl-5-(2'-pyridyl)-1H-1,5-benzodiazepine-2,4-(3H,5H)-dione

A mixture of 225 gm. (1 mol) of 7-chloro-1-methyl-1H-1,5-benzodiazepine-2,4-(3H,5H)-dione, 147 gm. (1.5 mol) of potassium acetate, 225 gm. (1.6 mol) of o-bromo-pyridine, 180 gm. of copper powder and 1300 ml. of dimethylformamide was heated for 15 hours at 160° C. while stirring. The mixture was vacuum-filtered while hot over a little kieselguhr and washed afterwards with 200 ml. of hot dimethylformamide. Upon cooling, a crystalline product separated out of the filtrate. 2 liters of semi-concentrated ammonia were stirred into the mixture, stirring was continued for 15 minutes, it was vacuum-filtered, the filter cake was washed with water until free from copper, and the raw product obtained was recrystallized from acetonitrile and subsequently from methylenechloride-petroleum ether.

Yield: 50–55% of theory of the compound of the formula

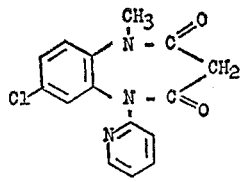

having a melting point of 231–233° C.

The starting material was obtained as follows: 373 gm. (2 mol) of 2-nitro-4-chloro-N-methylaniline were refluxed with 330 gm. of malonic acid monoethylester chloride in 1500 ml. of benzene for 2–3 hours. After cooling, washing and evaporation, 590 gm. of 2-nitro-4-chloro-N-methyl-malonic acid-monoethylester-anilide were obtained. 200 gm. of this ester, upon being hydrogenated in methanol with Raney nickel at 6 atmospheres and 20° C., yielded 137 gm. of 2-amino-4-chloro-N-methylmalonic acid ethyl-ester-anilide, M.P. 114–117° C. 872.2 gm. of the amino-ester were stirred at room temperature into a solution of 81.5 gm. of sodium in 7.25 liters of ethanol. The sodium salt of 7-chloro-1-methyl-1H-1,5-benzodiazepine-2,4-(3H,-5H)-dione precipitated. It was vacuum filtered off, dissolved in 3 liters of water the solution was acidified with concentrated hydrochloric acid, vacuum filtered, and the filter cake was dried at 100° C. in vacuo.

Yield: 596 gm. (82.5% of theory), M.P. 215–217° C.

EXAMPLE 2

1-methyl - 5 - (2'-nitrophenyl) - 7 - trifluoromethyl-1,5-benzodiazepine-2,4-(3H-5H)-dione 26 gm. (0.1 mol) of 1-methyl-7-trifluoromethyl-1,5-benzodiazepine-2,4-(3H,5H)-dione were heated with 13 gm. of potassium acetate, 1 gm. of anhydrous copper sulfate and 350 gm. of o-chloro-nitrobenzene for one hour at 150° C. The reaction solution was diluted with methylene chloride, washed with dilute ammonia, sodium hydroxide solution and water, the organic phase was dried, and the solvent evaporated in vacuo. The residue was carefully admixed with petroleum ether, whereby a precipitate was formed, which was recrystallized from methylene chloride/isopropylether. Yield: 30 gm. (80% of theory) of the compound of the formula

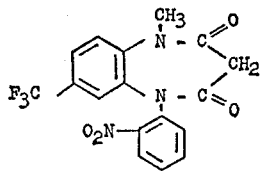

having a melting point of 230–232° C.

EXAMPLE 3

Using a procedure analogous to that described in Example 1, 1-methyl-5-(1'-naphthyl)-7-chloro-1,5-benzodiazepine-2,4-(3H,5H)-dione, M.P. 209–211° C., of the formula

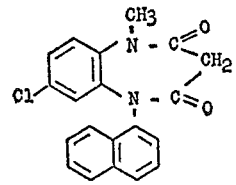

was prepared from 1-methyl-7-chloro-1,5-benzodiazepine-2,4-(3H,5H)-dione and 1-chloro-naphthalene.

EXAMPLE 4

Using a procedure analogous to that described in Example 1, 1-methyl-5-(2'-thienyl)-7-chloro-1,5-benzodiazepine-2,4-(3H,5H)-dione, M.P. 173–174° C., of the formula

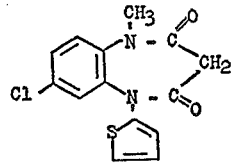

was prepared from 1-methyl-7-chloro-1,5-benzodiazepine-2,4-(3H,5H)-dione and o-bromo-thiophene.

EXAMPLE 5

Using a procedure analogous to that described in Example 1, 1-methyl-5-(3'-pyridyl)-7-chloro-1,5-benzodiazepine-2,4-(3H,5H)-dione, M.P. 164–166° C., of the formula

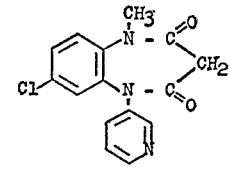

was prepared from 1-methyl-7-chloro-1,5-benzodiazepine-2,4-(3H,5H)-dione and m-bromo-pyridine.

EXAMPLE 6

Using a procedure analogous to that described in Example 1, 1-methyl-5-[5'-chloro-pyridyl-(2')]-7-chloro-1,5-benzodiazepine-2,4-(3H,5H)-dione, M.P. 216–217° C., of the formula

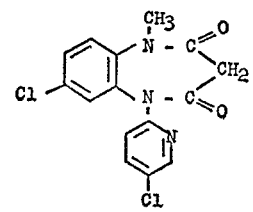

was prepared from 1-methyl-7-chloro-1,5-benzodiazepine-2,4-(3H,5H)-dione and 2,5-dichloro-pyridine.

EXAMPLE 7

Using a procedure analogous to that described in Example 1, 1-methyl-5-[4'-methyl-pyridyl-(2')]-7-chloro-1,5-benzodiazepine-2,4-(3H,5H)-dione, M.P. 225–227° C., of the formula

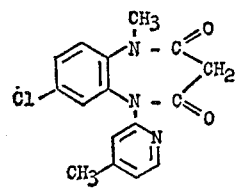

was prepared from 1-methyl-7-chloro-1,5-benzodiazepine-2,4-(3H,5H)-dione and 2-chloro-4-methyl-pyridine.

EXAMPLE 8

Using a procedure analogous to that described in Example 2, 1-methyl-5-(2'-nitro-phenyl)-7-chloro-1,5-benzodiazepine-2,4-(3H,5H)-dione, M.P. 206–208° C., of the formula

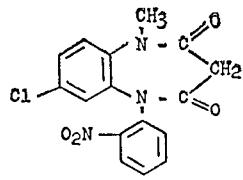

was prepared from 1-methyl-7-chloro-1,5-benzodiazepine-2,4-(3H,5H)-dione and o-chloro-nitrobenzene.

EXAMPLE 9

Using a procedure analogous to that described in Example 1, 1 - methyl - 5-(2'-cyano-phenyl)-7-chloro-1,5-benzodiazepine-2,4-(3H,5H)-dione, M.P. 209–210° C., of the formula

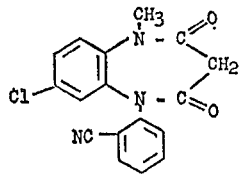

was prepared from 1-methyl-7-chloro-1,5-benzodiazepine-2,4-(3H,5H)-dione and o-chloro-cyanobenzene.

EXAMPLE 10

Using a procedure analogous to that described in Example 1, 1 - methyl - 5-(2'-methoxycarbonyl-phenyl)-7-chloro-1,5-benzodiazepine-2,4-(3H,5H)-dione, M.P. 183–184° C., of the formula

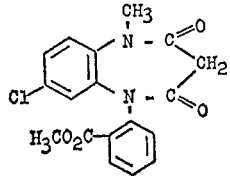

was prepared from 1-methyl-7-chloro-1,5-benzodiazepine-2,4-(3H,5H)-dione and methyl-o-chloro-benzoate.

EXAMPLE 11

Using a procedure analogous to that described in Example 1, 1 - methyl - 5-(2'-acetyl-phenyl)-7-chloro-1,5-benzodiazepine-2,4-(3H,5H)-dione, M.P. 205–206° C., of the formula

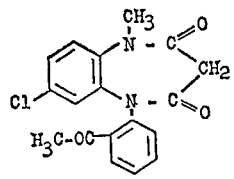

was prepared from 1-methyl-7-chloro-1,5-benzodiazepine-2,4-(3H,5H)-dione and o-chloro-acetophenone.

EXAMPLE 12

Using a procedure analogous to that described in Example 1, 1 - n-propyl-5-(2'-pyridyl)-7-chloro-1,5-benzodiazepine-2,4-(3H,5H)-dione, M.P. 177–178° C., of the formula

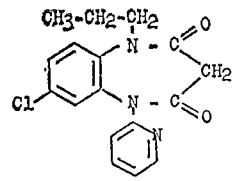

was prepared from 1 - n-propyl-7-chloro-1,5-benzodiazepine-2,4-(3H,5H)-dione and o-bromo-pyridine.

EXAMPLE 13

Using a procedure analogous to that described in Example 1, 1-methyl-5-phenyl-7-methoxycarbonyl-1,5-benzodiazepine-2,4-(3H,5H)-dione, M.P. 145–147° C., of the formula

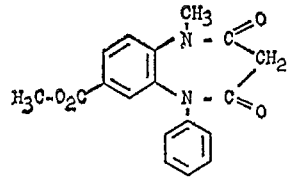

was prepared from 1 - methyl - 7-methoxycarbonyl-1,5-benzodiazepine-2,4-(3H,5H)-dione and chlorobenzene.

EXAMPLE 14

Using a procedure analogous to that described in Example 1, 1 - methyl-5-(2'-pyridyl)-7-chloro-1,5-benzodiazepine-2,4-(3H,5H)-dione, M.P. 244–246° C., was prepared from 1 - methyl - 7-chloro-1,5-benzodiazepine-2,4-(3H,5H)-dione and o-bromo-pyridine.

EXAMPLE 15

Using a procedure analogous to that described in Example 1, 1 - methyl-5-(2'-pyridyl)-7-trifluoromethyl-1,5-benzodiazepine-2,4-(3H,5H) - dione, M.P. 164–168° C., was prepared from 1-methyl-7-trifluoromethyl-1,5-benzodiazepine-2,4-(3H,5H)-dione and o-bromo-pyridine.

EXAMPLE 16

Using a procedure analogous to that described in Example 1, 1-ethyl-5-(2'-pyridyl)-8-chloro - 1,5 - benzodiazepine-2,4-(3H,5H)-dione, M.P. 194–196° C., of the formula

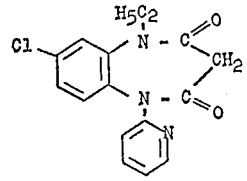

was prepare from 1-ethyl-8-chloro-1,5-benzodiazepine-2,4-(3H,5H)-dione and o-bromo-pyridine.

EXAMPLE 17

Using a procedure analogous to that described in Example 1, 1-ethyl-5-(2'-pyridyl)-7-chloro - 1,5 - benzodiazepine-2,4-(3H,5H)-dione, M.P. 194–196° C., was prepared from 1-ethyl-7-chloro-1,5-benzodiazepine-2,4-(3H,5H)-dione and o-bromo-pyridine.

EXAMPLE 18

Using a procedure analogous to that described in Example 1, 1-ethyl-5-(3'-pyridyl)-7-chloro - 1,5 - benzodiazepine-2,4-(3H,5H)-dione, M.P. 196–198° C., was prepared from 1-ethyl-7-chloro-1,5-benzodiazepine-2,4-(3H,5H)-dione and m-bromo-pyridine.

EXAMPLE 19

Using a procedure analogous to that described in Example 1, 1-n-butyl-5-(2'-pyridyl)-7-chloro-1,5-benzodiazepine-2,4-(3H,5H)-dione, M.P. 148–149° C., was prepared from 1-n-butyl-7-chloro-1,5-benzodiazepine-2,4-(3H,5H)-dione and o-bromo-pyridine.

EXAMPLE 20

Using a procedure analogous to that described in Example 1, 1-phenyl-5-(2'-pyridyl)-8-chloro-1,5-benzodiazepine-2,4-(3H,5H)-dione, M.P. 203–204° C., of the formula

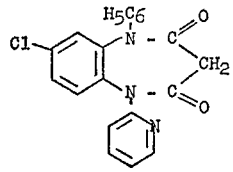

was prepared from 1-phenyl-8-chloro-1,5-benzodiazepine-2,4-(3H,5H)-dione and o-bromo-pyridine.

EXAMPLE 21

Using a procedure analogous to that described in Example 1, 1-methyl-5-(2'-pyridyl)-7-bromo-1,5-benzodiazepine-2,4-(3H,5H)-dione, M.P. 197–198° C., of the formula

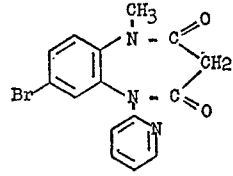

was prepared from 1-methyl-7-bromo-1,5-benzodiazepine-2,4-(3H,5H)-dione and o-bromo-pyridine.

EXAMPLE 22

Using a procedure analogous to that described in Example 1, 1-methyl-5-(2'-pyrimidyl)-7-chloro-1,5-benzodiazepine-2,4-(3H,5H)-dione, M.P. 243–245° C., of the formula

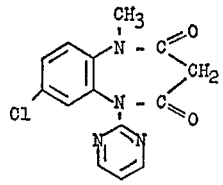

was prepared from 1-methyl-7-chloro-1,5-benzodiazepine-2,4-(3H,5H)-dione and o-bromo-pyrimidine.

EXAMPLE 23

Using a procedure analogous to that described in Example 1, 1-cyclohexyl-5-(2'-pyridyl) - 7 - chloro - 1,5-benzodiazepine-2,4-(3H,5H)-dione, M.P. 190° C., of the formula

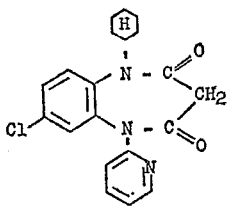

was prepared from 1-cyclohexyl-7-chloro-1,5-benzodiazepine-2,4-(3H,5H)-dione and o-bromo-pyridine.

EXAMPLE 24

Using a procedure analogous to that described in Example 1, 1-isopropyl-5-(2'-pyridyl)-7-chloro-1,5-benzodiazepine-2,4-(3H,5H)-dione, M.P. 165–167° C., was prepared from 1-isopropyl-7-chloro-1,5-benzodiazepine-2,4-(3H,5H)-dione and o-bromo-pyridine.

EXAMPLE 25

Using a procedure analogous to that described in Example 1, 1-methyl-5-phenyl-7-acetyl-1,5-benzodiazepine-2,4-(3H,5H)-dione, M.P. 134–137° C., of the formula

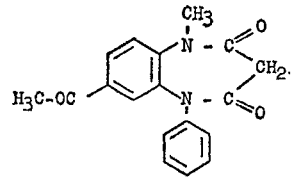

was prepared from 1-methyl-7-acetyl-1,5-benzodiazepine-2,4-(3H,5H)-dione and chlorobenzene.

EXAMPLE 26

Using a procedure analogous to that described in Example 1, 1-(β-hydroxy-ethyl)-5-(2'-pyridyl)-7-chloro-1,5-benzodiazepine-2,4-(3H,5H)-dione, M.P. 176–178° C., of the formula

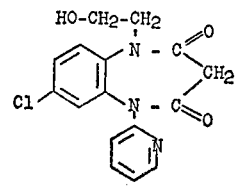

was prepared from 1-(β-hydroxy-ethyl)-7-chloro-1,5-benzodiazepine-2,4-(3H,5H)-dione and o-bromo-pyridine.

EXAMPLE 27

Using a procedure analogous to that described in Example 1, 1-ethyl-5-(2'-pyridyl)-7-trifluoromethyl-1,5-benzodiazepine-2,4-(3H,5H)-dione, M.P. 153–155° C., was prepared from 1-ethyl-7-trifluoromethyl-1,5-benzodiazepine-2,4-(3H,5H)-dione and o-bromo-pyridine.

EXAMPLE 28

Using a procedure analogous to that described in Example 1, 1-benzyl-5-(2'-pyridyl)-7-chloro-1,5-benzodiazepine-2,4-(3H,5H)-dione, M.P. 216–128° C., of the formula

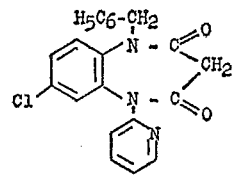

was prepared from 1-benzyl-7-chloro-1,5-benzodiazepine-2,4-(3H,5H)-dione and o-bromo-pyridine.

EXAMPLE 29

Using a procedure analogous to that described in Example 1, 1-(β-hydroxy-ethyl)-5-(2'-pyridyl)-7-trifluoromethyl - 1,5 - benzodiazepine - 2,4 - (3H,5H) - dione, M.P. 149–151° C., was prepared from 1-(β-hydroxy-ethyl) - 7 - trifluoromethyl - 1,5 - benzodiazepine - 2,4 - (3H,5H)-dione and o-bromo-pyridine.

EXAMPLE 30

Using a procedure analogous to that described in Example 1, 1-(β-acetoxy-ethyl)-5-(2'-pyridyl)-7-chloro-1,5-benzodiazepine-2,4-(3H,5H)-dione, M.P. 196–198° C., of the formula

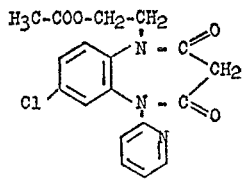

was prepared from 1-(β-acetoxy-ethyl)-7-chloro-1,5-benzodiazepine-2,4-(3H,5H)-dione and o-bromo-pyridine.

EXAMPLE 31

Using a procedure analogous to that described in Example 2, 1-(γ-hydroxy-propyl)-5-(o-nitro-phenyl)-7-chloro-1,5-benzodiazepine-2,4-(3H,5H)-dione, M.P. 162–163° C., of the formula

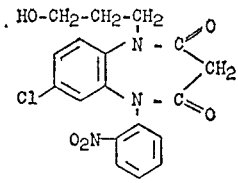

was prepared from 1-(γ-hydroxy-propyl)-7-chloro-1,5-benzodiazepine-2,4-(3H,5H)-dione and o-chloro-nitrobenzene.

EXAMPLE 32

Using a procedure analogous to that described in Example 2, 1-cyclohexyl-5-(o-nitro-phenyl)-7-chloro-1,5-benzodiazepine-2,4-(3H,5H)-dione, M.P. 182–183° C., was prepared from 1-cyclohexyl-7-chloro-1,5-benzodiazepine-2,4-(3H,5H)-dione and o-chloro-nitrobenzene.

EXAMPLE 33

Using a procedure analogous to that described in Example 1, 1-methyl-5-phenyl - 7 - cyano - 1,5 - benzodiazepine - 2,4 - (3H,5H)-dione, M.P. 260–262° C., of the formula

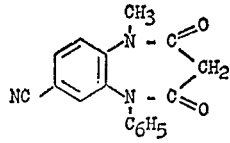

was prepared from 1-methyl-7-cyano-1,5-benzodiazepine-2,4-(3H,5H)-dione and chlorobenzene.

The compounds according to the present invention, i.e. those embraced by Formulas I, II and III above, have useful pharmacodynamic properties. More particularly, the compounds of the instant invention exhibit very effective psychosedative and anticonvulsive activities in warm-blooded animals, such as mice, rats, golden hamsters, cats and dogs, with extremely low toxicity.

Particularly effective are those compounds of the Formulas I, II and III wherein $R_1$ is straight or branched alkyl of 1 to 3 carbon atoms or hydroxyalkyl of 2 to 3 carbon atoms,
$R_2$ is hydrogen,
$R_3$ is pyridyl,
$R_4$ is halogen, trifluoromethyl or cyano in 7-position,
$R_5$ is trifluoromethyl, nitro, cyano or halogen in 2-position,
$R_6$ is hydrogen,
$R_7$ is cyano in 7-position,
$R_8$ is cyano or nitro,
$R_9$ is hydrogen, and
$R_{10}$ is halogen or trifluoromethyl in 7-position.

The psychosedative and anticonvulsive activities of the compounds according to the present invention were ascertained by standard pharmacological test methods on laboratory animals, namely, Swinyard et al., J. Pharmacol. Exptl. Ther. volume 106, p. 319 (1952); Janssen et al., Psychopharmacologia volume 1, p. 389 (1960); and Broadhurst et al., J. Genet. Psychol. volume 95, p. 217 (1959).

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0083 to 0.84 mgm./kg. body weight, preferably 0.0166 to 0.42 mgm./kg. body weight. The daily dose rate is from 0.083 to 2.5 mgm./kg.

Such dosage unit compositions may, in addition to one or more of the compounds according to the invention, also contain one effective dosage unit of one or more other pharmacologically active ingredients, such as spasmolytics or psychopharmaceuticals.

The following examples illustrate a few dosage unit compositions comprising a compound of the instant invention as an active ingredient and represent the best mode contemplated of putting the invention to practical use. The parts are parts by weight unless otherwise specified.

EXAMPLE 34

Coated pills

The pill core composition was compounded from the following ingredients:

| | Parts |
|---|---|
| 7 - chloro - 1 - isopropyl - 5 - (2' - pyridyl) - 1H-1,5 - benzodiazepine - 2,4 - (3H,5H) - dione | 5.0 |
| Lactose | 28.5 |
| Corn starch | 15.0 |
| Gelatin | 1.0 |
| Magnesium stearate | 0.5 |
| Total | 50.0 |

Compounding procedure:

The benzodiazepinedione compound was intimately admixed with the lactose and the corn starch, the mixture was granulated by moistening it with an aqueous 10% solution of the gelatin and forcing the moist mass through a 1 mm.-mesh screen, and the granulate was dried at 40° C. and again passed through the screen. The resulting dry granulate was admixed with the magnesium stearate, and the mixture was compressed into 50-mgm. pill cores, which were then coated with a thin shell consisting essentially of an aqueous suspension of sugar, titanium dioxide, talcum and gum arabic. The coated pills were finally polished with beeswax. Each coated pill contained 5.0 mgm. of the benzodiazepinedione compound and, when administered perorally to a warm-blooded animal of about 60 kg. body weight in need of such treatment, produced very good psychosedative and anticonvulsive effects.

Analogous results were obtained when an equal amount of the following compounds was substituted for the benzodiazepinedione compound in the above pill core composition:

(a) 7-chloro-1-methyl-5-(2'-nitro-phenyl)-1H-1,5-benzodiazepine-2,4-(3H,5H)-dione;
(b) 7-chloro-1-methyl-5-(2'-pyridyl)-1H-1,5-benzodiazepine-2,4-(3H,5H)-dione;
(c) 7-chloro-1-methyl-5-(2'-cyano-phenyl)-1H-1,5-benzodiazepine-2,4-(3H,5H)-dione;
(d) 7-bromo-1-methyl-5-(2'-pyridyl)-1H-1,5-benzodiazepine-2,4-(3H,5H)-dione; and
(e) 1-methyl-5-(2'-pyridyl)-7-trifluoromethyl-1H-1,5-benzodiazepine-2,4-(3H,5H)-dione.

EXAMPLE 35

Suppositories

The suppository composition was compounded from the following ingredients:

| | Parts |
|---|---|
| 7-cyano-1-methyl - 5 - phenyl-1H-1,5-benzodiazepine-2,4-(3H,5H)-dione | 5.0 |
| Cocoa butter | 1695.0 |
| Total | 1700.0 |

Compounding procedure:

The finely powdered benzodiazepinedione compound was stirred with the aid of an immersion homogenizer with the coca butter which had previously been melted and cooled to 40° C. 1700 mgm.-portions of the homogeneous mixture were then poured at 35° C. into cooled suppository molds. Each suppository contained 5.0 mgm. of the benzodiazepinedione compound and, when administered by the rectal route to a warm-blooded animal of about 60 kg. body weight in need of such treatment, produced very good psychosedative and anti-convulsive effects.

Analogous results were obtained when an equal amount of 7 - chloro - 1 - methyl - 5 - (2' - cyano-phenyl)-1H-1,5-benzodiazepine-2,4-(3H,5H)-dione was substituted for the benzodiazepinedione compound in the above suppository composition.

Analogous results were also obtained when an equal amount of any one of the other compounds embraced by Formulas I, II and III above was substituted for the particular benzodiazepinedione compounds in Examples 34 and 35. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:

1. A compound of a formula selected from the group consisting of

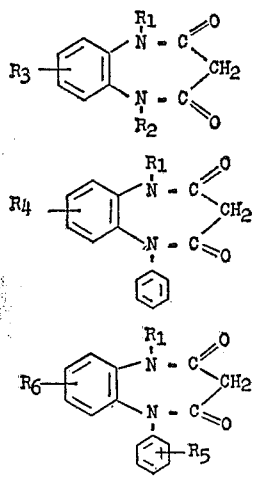

wherein $R_1$ is alkyl of 1 to 4 carbon atoms, hydroxyethyl, hydroxypropyl, acetoxyethyl, cyclohexyl, benzyl or phenyl,
$R_2$ is naphthyl, pyrimidyl, thienyl, pyridyl, methyl-pyridyl or chloropyridyl,
$R_3$ is chlorine, bromine, trifluoromethyl or cyano,
$R_4$ is cyano, acetyl or methoxycarbonyl,
$R_5$ is cyano, nitro, acetyl or methoxycarbonyl, and
$R_6$ is halogen or trifluoromethyl.

2. A compound of a formula selected from the group consisting of

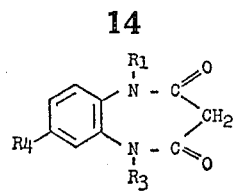

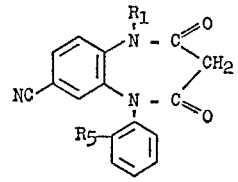

and

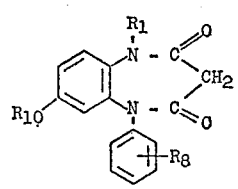

wherein $R_1$ is straight or branched alkyl of 1 to 3 carbon atoms or hydroxyalkyl of 2 to 3 carbon atoms,
$R_3$ is pyridyl,
$R_4$ is halogen, trifluoromethyl or cyano,
$R_5$ is hydrogen, trifluoromethyl, nitro, cyano or halogen,
$R_8$ is cyano or nitro, and
$R_{10}$ is halogen or trifluoromethyl.

3. A compound according to claim 1, which is 7-chloro-1 - methyl - 5 - (2'-pyridyl)-1H-1,5-benzodiazepine-2,4-(3H,5H)-dione.

4. A compound according to claim 1, which is 7-cyano-1 - methyl-5-phenyl-1H-1,5-benzodiazepine-2,4-(3H,5H)-dione.

5. A compound according to claim 1, which is 5-(2'-acetyl-phenyl) - 7 - chloro-1-methyl-1H-1,5-benzodiazepine-2,4-(3H,5H)-dione.

6. A compound according to claim 1, which is 1-methyl-5 - (2'-pyridyl)-7-trifluoromethyl-1H-1,5-benzodiazepine-2,4-(3H,5H)-dione.

7. A compound according to claim 1, which is 1-ethyl-7 - chloro - 5 - (2'-pyridyl)-1H-1,5-benzodiazepine-2,4-(3H,5H)-dione.

8. A compound according to claim 1, which is 7-bromo-1 - methyl - 5 - (2'-pyridyl)-1H-1,5-benzodiazepine-2,4-(3H,5H)-dione.

References Cited

UNITED STATES PATENTS 3,391,138   7/1968   Archer et al. ____ 260—239.30
3,429,874   2/1969   Topliss _____ 260—239.30

OTHER REFERENCES

Rossi et al. "A Chimica e l'Industria," vol. 51, No. 5, May 1969, pp. 479–485.

Buchi et al. "Helv. Chim. Acta," vol. 39, pp. 957–965 (1956).

HENRY R. JILES, Primary Examiner

R. T. BOND, Assistant Examiner

U.S. Cl. X.R.

260—251, 332.2, 562, 295; 424—244, 251, 263, 275

UNITED STATES PATENT OFFICE
CERTIFICATE OF CORRECTION

Patent No. 3,660,381        Dated May 2, 1972

Inventor(s) NOEL VLAEMINCK

It is certified that error appears in the above-identified patent and that said Letters Patent are hereby corrected as shown below:

On the front page of the patent, item [73] Assignee, delete

"AUTOMATIC ELECTRIC LABORATORIES, INC." and add --

GTE AUTOMATIC ELECTRIC LABORATORIES INCORPORATED --.

Signed and sealed this 17th day of April 1973.

(SEAL)
Attest:

EDWARD M. FLETCHER, JR.         ROBERT GOTTSCHALK
Attesting Officer        Commissioner of Patents

11/20/72

PO-1050
(5/69)

UNITED STATES PATENT OFFICE
CERTIFICATE OF CORRECTION

Patent No. 3,660,381      Dated May 2, 1972

Inventor(s) KARL-HEINZ WEBER, HERBERT MERZ, KARL ZEILE, ROLF GIESEMANN and PETER DANNEBERG It is certified that error appears in the above-identified patent and that said Letters Patent are hereby corrected as shown below:

Col. 1, line 9 - Insert --Claims priority, application Austria, July 12, 1968, A-6778/68--.

Col. 3, line 13- "$R_{17}$" should read --$R_{10}$--.

Col.13, line 4 - correct "coca" to read --cocoa--.

Signed and Sealed this second Day of March 1976

[SEAL]

Attest:

RUTH C. MASON
Attesting Officer

C. MARSHALL DANN
Commissioner of Patents and Trademarks

Notice of Adverse Decision in Interference

In Interference No. 98,772 involving Patent No. 3,660,381, K. Weber, H. Merz, K. Zeile, R. Giesemann and P. Danneberg, 5-ARYL-1H-1,5-BENZO-DIAZEPINE-2,4-DIONES, final judgment adverse to the patentees was rendered Nov. 11, 1975, as to claim 1.

[*Official Gazette March 23, 1976.*]